(12) United States Patent
Arndt et al.

(10) Patent No.: US 6,336,545 B1
(45) Date of Patent: Jan. 8, 2002

(54) CONVEYOR SUPPORT CRAWLER FOR A MOBILE CONVEYOR SYSTEM

(75) Inventors: Bruce Arndt, Algonquin; A. Steven Ledger, Addison; Robert F. Oury, Gilberts, all of IL (US)

(73) Assignee: Rotec Industries Inc., Elmhurst, IL (US)

( * ) Notice: Subject to any disclaimer, the term of this patent is extended or adjusted under 35 U.S.C. 154(b) by 0 days.

(21) Appl. No.: 09/464,942

(22) Filed: Dec. 16, 1999

Related U.S. Application Data

(60) Provisional application No. 60/112,355, filed on Dec. 16, 1998.

(51) Int. Cl.[7] ............................................. B65G 41/00
(52) U.S. Cl. ...................................... 198/303; 198/300
(58) Field of Search ................................ 198/300, 303, 198/314

(56) References Cited

U.S. PATENT DOCUMENTS

| | | | |
|---|---|---|---|
| 3,361,248 A | * | 1/1968 | Daymon ..................... 198/303 |
| 4,054,213 A | * | 10/1977 | Chever ..................... 198/303 X |
| 4,646,906 A | | 3/1987 | Wilcox, Jr. et al. ......... 198/303 |
| 5,188,208 A | * | 2/1993 | Hall ....................... 198/303 X |
| 5,230,587 A | | 7/1993 | Pensoneau .................. 405/129 |
| 5,634,545 A | | 6/1997 | Plumley ...................... 198/303 |
| 5,762,179 A | | 6/1998 | Oury et al. ............... 198/861.1 |
| 5,797,481 A | | 8/1998 | Uber et al. .................. 198/813 |

* cited by examiner

Primary Examiner—James R. Bidwell
(74) Attorney, Agent, or Firm—McAndrews, Held & Malloy, Ltd.

(57) ABSTRACT

Single-track and a dual-track conveyor support crawlers are employed in conjunction with a mobile conveyor system. The crawlers comprise rotational coupling between single-track base units and structure link members. The crawlers further comprise a steering subsystem to control relative rotation between the single-track base units and the structure link members. The crawlers comprise translational coupling between the single-track base units and the structure link members, and elevation control subsystems to control the relative vertical position between the single-track base units and the structure link members.

19 Claims, 4 Drawing Sheets

CONVEYOR SUPPORT CRAWLER FOR A MOBILE CONVEYOR SYSTEM

CROSS-REFERENCE TO RELATED APPLICATION

This application is related to and claims priority benefits from U.S. Provisional Patent Application Ser. No. 60/112,355 filed Dec. 16, 1998, entitled "Hazardous Waste Pond Conveyor System". The '355 provisional application is incorporated herein by reference in its entirety.

FIELD OF THE INVENTION

The present invention relates generally to a mobile structure support crawler. More specifically, the present invention relates to a conveyor span support crawler for mobile conveyor systems.

BACKGROUND OF THE INVENTION

In conveyor applications, conveyors are used to transport material from a source point to a destination point. In some conveyor applications, the source point and/or the destination point may vary during the course of the conveying operation. Mobile conveyors provide the capability to track dynamic material source and destination points.

In one example, a conveyor system is used to deposit a layer of material over a predetermined area of deposition. The conveyor system includes a conveyor span that extends longitudinally over the area of deposition. Mobile discharge apparatus traverses the longitudinal length of the conveyor span transferring material from the conveyor to the general area adjacent to the conveyor. When the mobile discharge apparatus completes a longitudinal pass, the conveyor span must be moved laterally in a direction transverse to its longitudinal direction to set up for the next longitudinal pass of the mobile discharge apparatus.

Crawler apparatus is sometimes used for moving mobile conveyor spans. The crawler apparatus incorporates dual-parallel-track drives similar to those found on earth-moving equipment and military vehicles. Crawler apparatus incorporating a dual-parallel-track drive is generally wider than necessary. A wide crawler requires more lateral space to operate than a narrow crawler does, and thus may be less desirable for applications with tight lateral space requirements. In addition, dual-parallel-track crawlers are typically large and heavy, and accordingly, are relatively expensive to transport. Dual-parallel-track crawlers also have relatively complicated drive systems, which result in low manufacturability, high susceptibility to failure, and low maintainability.

A need has long existed for a crawler for supporting a conveyor span that is light, narrow, efficiently transportable, and economical to produce and maintain.

An object of the present conveyor-support crawler is to provide a crawler that has a narrow footprint.

Another object of the present conveyor-support crawler to provide a crawler that is lightweight.

A further object of the present conveyor-support crawler is to provide a crawler that is efficiently transportable.

A still further object of the present conveyor-support crawler is to provide a crawler that is economical to produce and maintain.

SUMMARY OF THE INVENTION

One or more of the foregoing objects is met in whole or in part by the present single-track crawler for supporting a conveyor span. The single-track crawler comprises a single-track base unit. A structure link member is vertically translationally coupled to the single-track crawler. An elevation control system, comprising a linear mover, controls the vertical displacement between the structure link member and the single-track base unit.

The structure link member is also rotationally coupled to the single-track crawler. The single-track crawler comprises a steering subsystem that is coupled to the structure link member and the single-track base unit. The steering subsystem controls the horizontal rotation between the structure link member and the single-track base unit. The steering subsystem comprises an articulated link, the length of which controls the horizontal rotation between the structure link member and the single-track base unit.

An alternate embodiment of the present invention provides a dual-track crawler comprising two of the single-track crawlers. A crawler linking member and two shoe assemblies couple the two single-track crawlers. The two shoe assemblies comprise structure support brackets for coupling the dual-track crawler to a conveyor span.

DETAILED DESCRIPTION OF PREFERRED EMBODIMENT(S)

In the following detailed description, spatially orienting terms are used, such as "upper," "lower," "left," "right," "vertical," "horizontal," and the like. It is to be understood that these terms are used for convenience of description of the preferred embodiments by reference to the drawings. These terms do not necessarily describe the absolute location in space, such as left, right, upward, downward, etc., that any part must assume.

Figure 1:
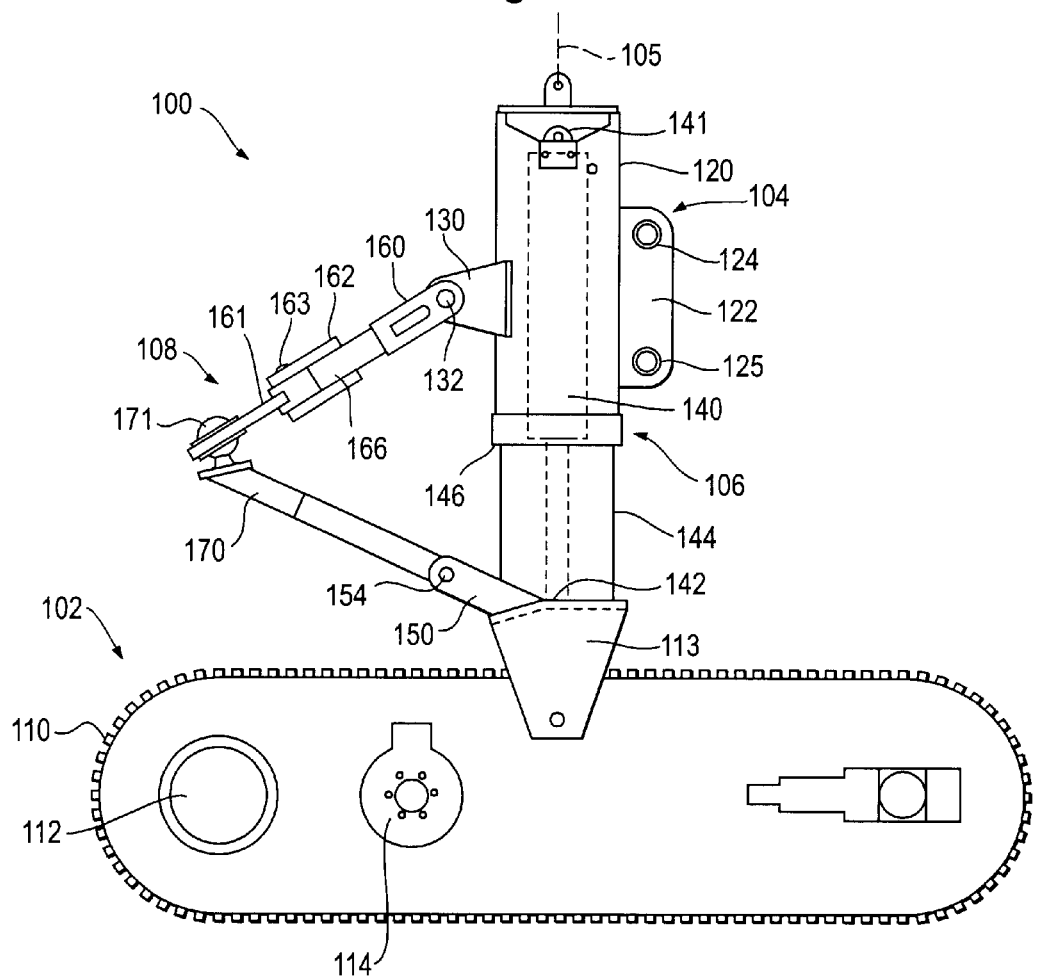
FIG. 1 illustrates an embodiment of the present single-track crawler.
Figure 2:
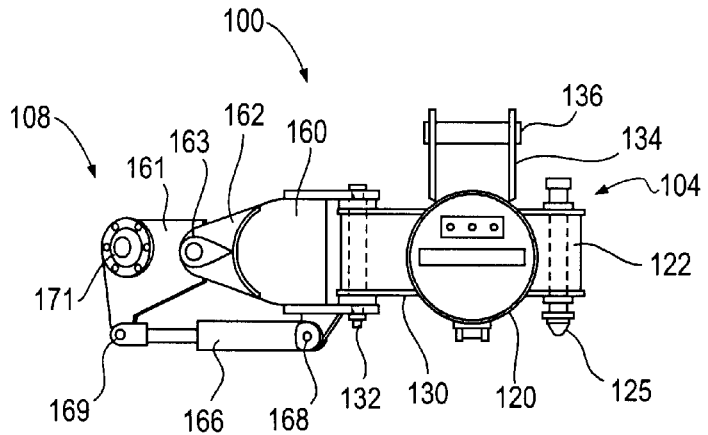
FIG. 2 is a top view of the single-track crawler illustrated in FIG. 1.
Figure 3:
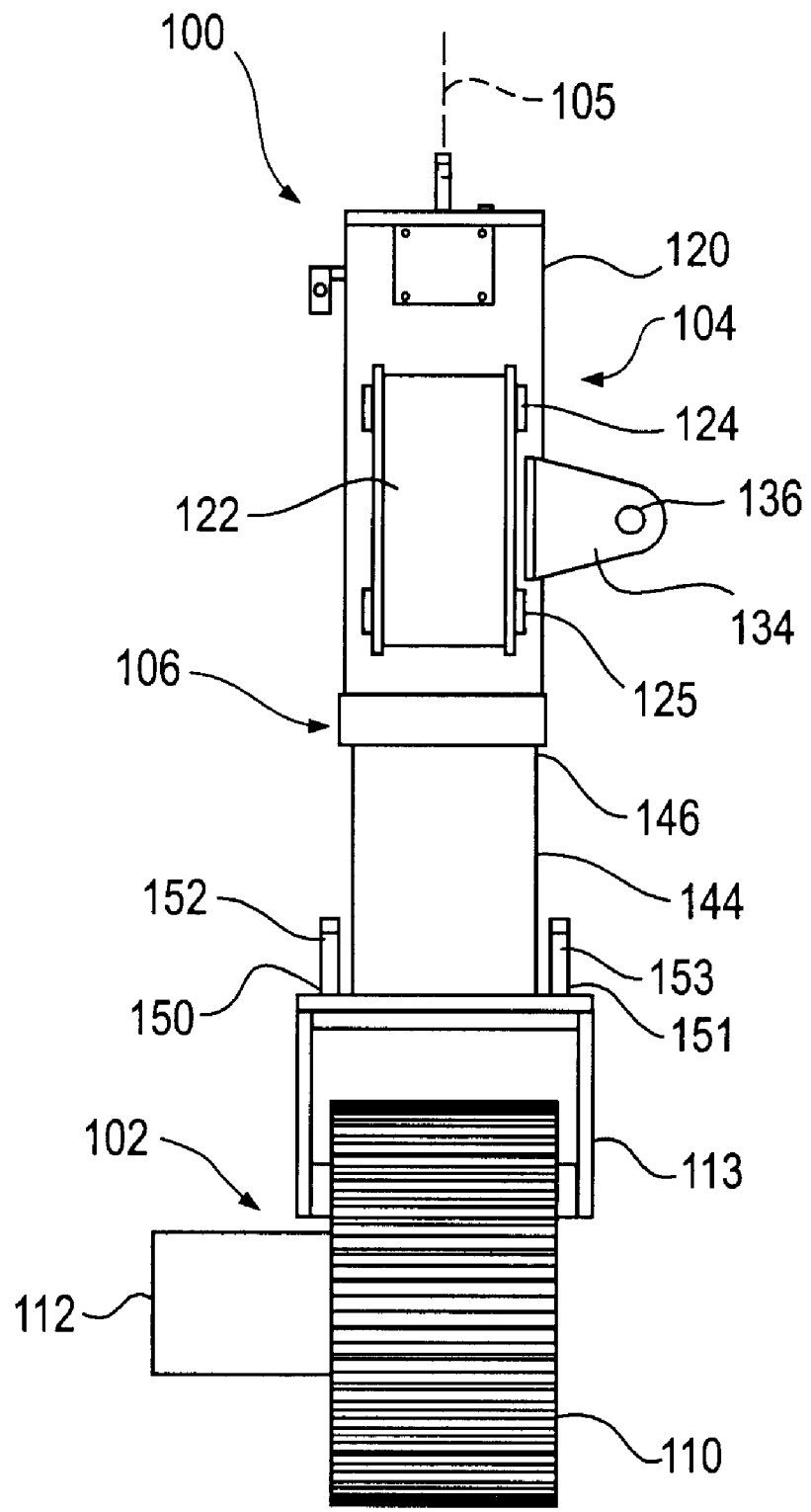
FIG. 3 is a side view of the single-track crawler illustrated in FIG. 1.

Referring now to FIGS. 1–3, FIG. 1 illustrates a single-track crawler 100 according to an embodiment of the present invention. FIGS. 2 and 3 illustrate top and side views, respectively, of the single-track crawler 100 illustrated in FIG. 1.

The single-track crawler 100 comprises a single-track base unit 102. A structure link member 104 is coupled to the single-track base unit 102. An elevation control subsystem 106 is coupled to the single-track base unit 102 and the structure link member 104. A steering subsystem 108 is also coupled to the single-track base unit 102 and the structure link member 104.

The single-track base unit 102 comprises a track 110. Wheels (not shown) support the track 110 and allow the track 110 to rotate. A prime mover 112 is coupled to the track 110 with a transmission (not shown). The prime mover 112 drives the track 110 through the transmission to move the single-track crawler 100. A base unit attachment member 113 is attached to the single-track base unit 102. The base unit attachment member 113 couples the single-track base unit 102 to the elevation control subsystem 106 and the steering subsystem 108. A position sensor 114, such as an optical encoder or resolver, may be coupled to moving members of the single-track base unit 102. The position sensor 114 could be used to acquire position data, which could then be used by a position control system to control the movement of the single-track crawler 100.

The structure link member 104 is translationally and rotationally coupled to the single-track base unit 102. The structure link member 104 is free to translate along the vertical axis 105 relative to the single-track base unit 102. The structure link member 104 is also free to rotate in the horizontal plane about the vertical axis 105. The structure link member 104 is preferably coupled to the conveyor structure being supported by the single-track crawler 100.

The structure link member 104 comprises a main body 120. A structure attachment member 122 is attached (preferably welded) to the main body 120. The structure attachment member 122 comprises apertures for structure attachment pins 124, 125. The structure attachment pins 124, 125 couple the structure link member 104 to the structure being supported by the single-track crawler 100.

The structure link member 104 comprises a side steering attachment member 130. The side steering attachment member 130 is attached (preferably welded) to the main body 120. The side steering attachment member 130 comprises an aperture for a substantially horizontal upper steering attachment pin 132. The upper steering attachment pin 132 couples the steering subsystem 108 to the structure link member 104. The steering subsystem 108 is coupled to the structure link member 104 at the side steering attachment member 130 when the single-track base unit 102 is in the lateral rotational position.

The structure link member 104 further comprises a rear steering attachment member 134. The rear steering attachment member 134 is disposed ninety degrees around the perimeter of the main body 120 from the side steering attachment member 130. The rear steering attachment member 134 comprises a rear steering aperture 136 to receive a substantially horizontal upper steering attachment pin 132. The steering subsystem 108 is coupled to the structure link member 104 at the rear steering attachment member 134, when the single-track base unit 102 is in the longitudinal rotational position.

The elevation control subsystem 106 vertically translationally couples the structure link member 104 to the single-track base unit 102. The elevation control subsystem 106 controls the vertical distance between the single-track base unit 102 and the structure link member 104. The elevation control subsystem 106 comprises a linear mover 140. The linear mover 140 provides the vertical force necessary to support the structure supported by the single-track crawler 100. The linear mover 140 preferably comprises a hydraulic cylinder but may comprise an alternative linear mover, such as a heavy-duty screw drive. The linear mover 140 has an upper end 141 and a lower end 142. The upper end 141 is coupled to the main body 120 of the structure link member 104, and the lower end 142 is coupled to the base unit attachment member 113. A lower protective housing 144 translationally engages the main body 120 of the structure link member 104 at a sliding joint 146.

Lower steering attachment plates 150, 151 are attached (preferably welded) to the base unit attachment member 113. The lower steering attachment plates 150, 151 comprise lower steering apertures 152, 153, respectively. The lower steering apertures 152, 153 receive a lower steering pin 154, which couples the steering subsystem 108 to the single-track base unit 102.

The steering subsystem 108 comprises an upper hinged member 160 and a lower hinged member 161. The upper hinged member 160 is rotationally coupled to the side steering attachment member 130 with the upper steering attachment pin 132. The upper hinged member 160 is free to rotate about the longitudinal axis of the upper steering attachment pin 132 (also referred to as the "horizontal hinge axis"). The upper hinged member 160 generally defines a hinged-member plane, which includes the horizontal hinge axis. The hinged-member plane rotates with the upper hinged member 160.

The lower hinged member 161 lies generally in the hinged-member plane and is rotationally coupled to the upper hinged member 160 with a steering hinge 162. The steering hinge 162 comprises a steering hinge pin 163 with a longitudinal axis that is orthogonal to the hinged-member plane. Thus, the lower hinged member 161 is free to rotate in the hinged-member plane relative to the upper hinged member 160.

The rotational position between the upper hinged member 160 and the lower hinged member 161 about the steering hinge pin 163 is governed by an articulated link 166. The upper hinged member 160 comprises an upper articulated link hinge 168, the rotational axis of which is parallel to the rotational axis of the steering hinge 162. The lower hinged member 161 comprises a lower articulated link hinge 169, the rotational axis of which is parallel to the rotational axis of the steering hinge 162. The articulated link 166 is rotationally coupled to the upper articulated link hinge 168 and the lower articulated link hinge 169. Thus, the articulated link 166 is free to rotate in the hinged-member plane relative to the upper hinged member 160 and the lower hinged member 161.

The steering hinge 162 is offset from the line between the upper articulated link hinge 168 and the lower articulated link hinge 169. Thus, as the length of the articulated link 166 varies, the lower hinged member 161 will rotate about the steering hinge pin 163 relative to the upper hinged member 160. The articulated link 166 preferably comprises a hydraulic cylinder, but may comprise an alternative linear displacement device, such as a screw drive.

The steering subsystem 108 comprises a fixed link 170. The lower steering pin 154 couples the fixed link 170 to the lower steering attachment plates 150, 151. The fixed steering link 170 is free to rotate about the longitudinal axis of the substantially horizontal lower steering pin 154 (also referred to as the "fixed-steering-link axis"). A spherical joint couples the fixed steering link 170 to the lower hinged member 161. The spherical joint 171 preferably comprises a ball joint and allows two-degree-of-freedom rotation between the articulated link 166 and the fixed steering link 170.

Note that the longitudinal axis of the lower steering pin 154 is substantially orthogonal to the axis of the steering hinge pin 163. As the articulated link 166 causes the lower hinged member 161 to rotate about the steering hinge pin 163, the rotational motion of the lower hinged member 161 causes the fixed steering link 170 to rotate about the vertical axis 105 of the structure link member 104. The fixed steering link 170 is coupled to the lower steering attachment plates 150, 151 so that no relative rotation between the fixed steering link 170 and the single-track base unit 102 about the vertical axis 105 is allowed. As the fixed steering link 170 rotates about the vertical axis 105 of the structure link member 104, the single-track base unit 102 also rotates about the vertical axis 105 of the structure link member 104. Thus, the length of the articulated link 166 controls the relative rotation between the single-track base unit 102 and the structure link member 104 about the vertical axis 105.

The full range of angular rotation between the single-track base unit 102 and the structure link member 104 about the vertical axis 105 provided by the steering subsystem 108 may be limited to angles less than 180 degrees. In some applications, a ninety-degree turn may be desirable. The preferred embodiment of the present invention provides a means for effecting a ninety-degree turn.

The single-track crawler 100 is illustrated in FIGS. 1–3 with the single-track base unit 102 in the lateral rotational position relative to the structure link member 104. In the lateral rotational position, the steering subsystem 108 is coupled to the side steering attachment member 130 of the structure link member 104. To accomplish a ninety degree turn, the steering subsystem 108 may be disconnected from the side steering attachment member 130. The single-track base unit may then be manually, or otherwise, rotated ninety degrees to the longitudinal position where the steering subsystem 108 may then be coupled to the rear steering attachment member 134.

The multiple steering attachment members 130, 134 provide a means for securing the steering subsystem 108 to predetermined positions around the perimeter of the structure link member 104. Thus the multiple steering attachment members 130, 134 provide gross steering capability, while the steering subsystem 108 provides fine steering capability.

Figure 4:
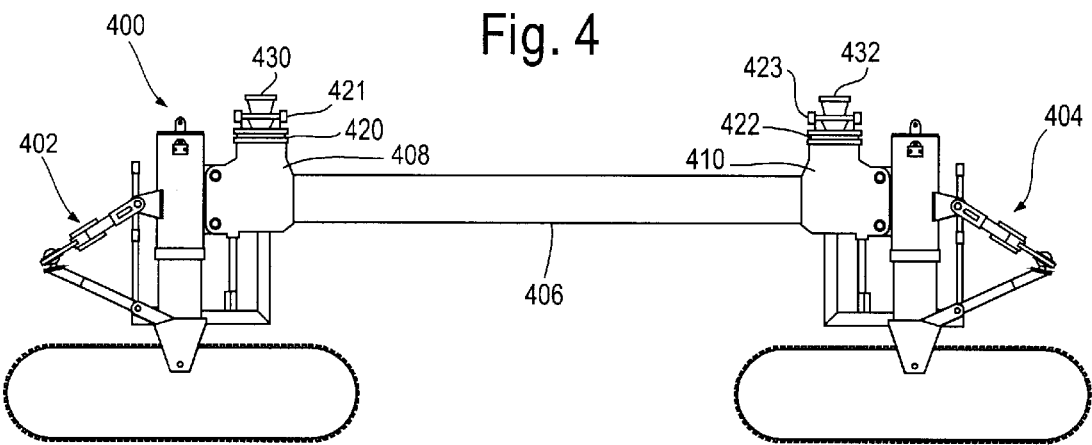
FIG. 4 illustrates a dual-track crawler according to an embodiment of the present invention.
Figure 5:
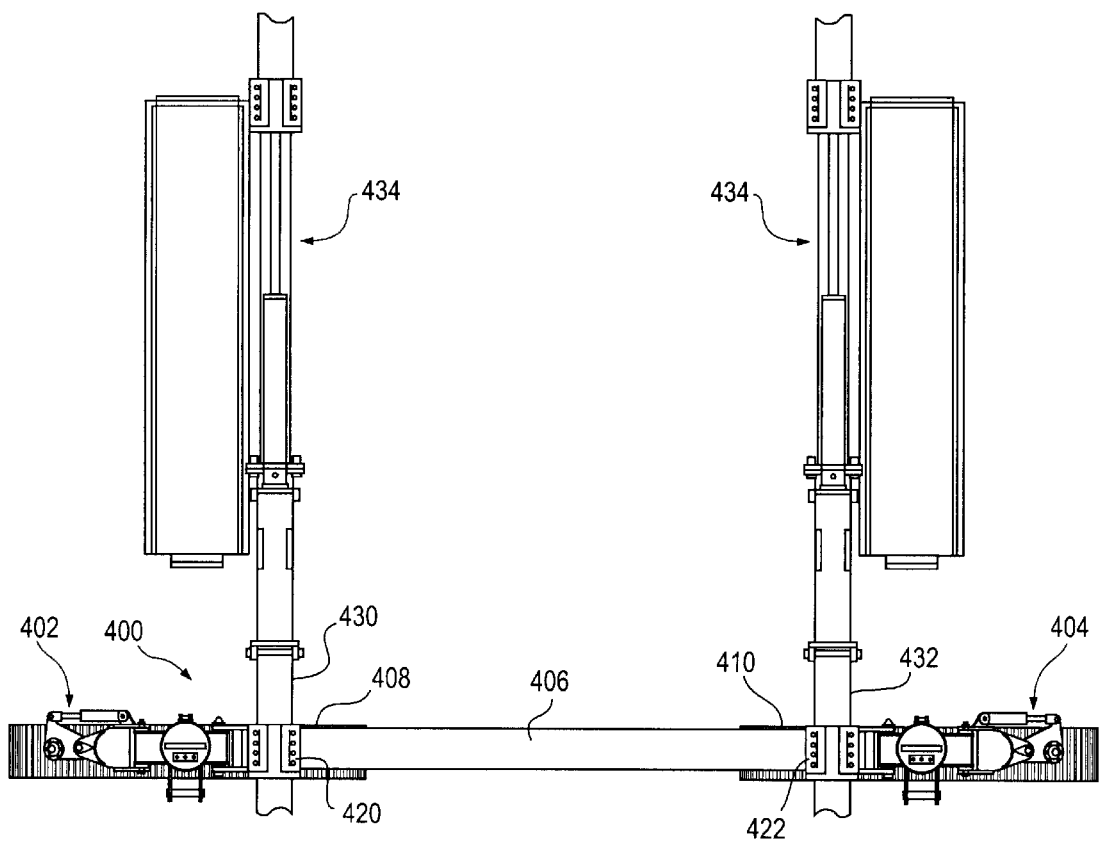
FIG. 5 shows a top view of the dual-track crawler illustrated in FIG. 4.

Referring now to FIGS. 4 and 5, FIG. 4 illustrates a dual-track crawler 400 according to an embodiment of the present invention, and FIG. 5 shows a top view of the dual-track crawler 400 illustrated in FIG. 4. The dual-track crawler 400 comprises a first single-track crawler 402 and a second single-track crawler 404. The first and second single-track crawlers 402, 404 are preferably identical to the single-track crawler 100 illustrated in FIGS. 1–3. A first shoe assembly 408 couples a crawler linking member 406 (preferably a lateral beam) to the first single-track crawler 402. A second shoe assembly 410 couples the crawler linking member 406 to the second single-track crawler 404.

The first shoe assembly 408 comprises a first structure support bracket 420. The first structure support bracket 420 comprises apertures and pins (one of which is denoted by label 421) for coupling the first shoe assembly 408 to the structure being supported. The second shoe assembly 410 comprises a second structure support bracket 422. The second structure support bracket 422 comprises apertures and pins (one of which is denoted by label 423) for coupling the second shoe assembly 410 to the structure being supported. FIGS. 4 and 5 show the dual-track crawler 400 connected to a first beam 430 and second beam 432 of a conveyor structure 434 being supported by the dual-track crawler 400.

Figure 6:
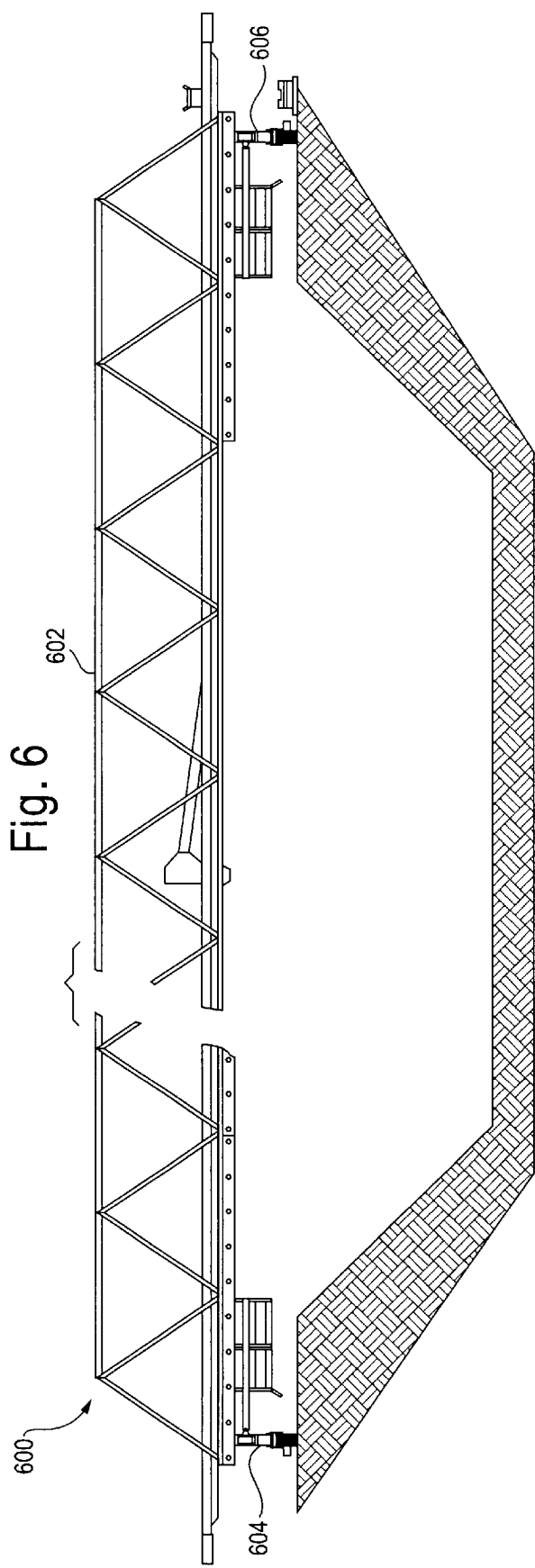
FIG. 6 illustrates a conveyor span supported by two dual-track crawlers.
Figure 7:
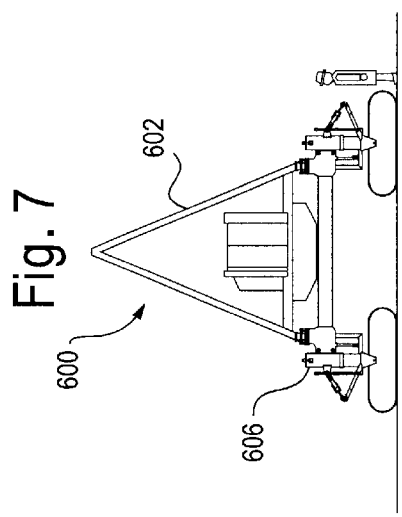
FIG. 7 shows a side view of the conveyor span illustrated in FIG. 6.

Referring now to FIGS. 6 and 7, FIG. 6 illustrates a mobile conveyor system 600, and FIG. 7 shows a side view of the mobile conveyor system 600 illustrated in FIG. 6. The mobile conveyor system 600 comprises a conveyor span 602 supported by a first dual-track crawler 604 and a second dual-track crawler 606. The first and second dual-track crawlers 604, 606 are preferably identical to the dual-track crawler 400 illustrated in FIGS. 4 and 5. The conveyor span 602 may, for example, be similar to that disclosed in co-owned U.S. patent application Ser. No. 09/464,940, now U.S. Pat. No. 6,276,521 which issued on Aug. 21, 2001, filed concurrently with the present application and entitled "Modular Truss Assembly For A Conveyor System", and which is incorporated herein by reference in its entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings.

What is claimed is:

1. A single-track crawler for supporting a conveyor span, the single-track crawler comprising:

a single-track base unit;

a structure link member rotationally coupled to said single-track base unit to allow relative rotation in the horizontal plane between said single-track base unit and said structure link member; and a plurality of steering attachment members disposed around the perimeter of said structure link member, said steering attachment members for securing said single-track base unit to predetermined set of rotational positions relative to said structure link member.

2. The single-track crawler of claim 1, wherein the two steering attachment members are disposed ninety degrees apart around the perimeter of said structure link member.

3. The single-track crawler of claim 1, further comprising a steering subsystem coupled to said single-track base unit and said structure link member, said steering subsystem controlling relative horizontal rotation between said single-track base unit and said structure link member.

4. A dual-track crawler for supporting a conveyor span, the dual-track crawler comprising:

a first single-track crawler as set forth in claim 3;

a second single-track crawler as set forth in claim 3; and a crawler linking member coupled to said first single-track crawler and said second single-track crawler.

5. The single-track crawler of claim 3, wherein said steering subsystem comprises:

an articulated link having an adjustable length; and a fixed steering link coupled to said articulated link, the relative horizontal rotation between said single-track base unit and said structure link member being a function of the adjustable length of said articulated link.

6. The single-track crawler of claim 5, wherein said articulated link comprises a hydraulic cylinder for controlling the adjustable length of said articulated link.

7. The single-track crawler of claim 5, further comprising a spherical joint coupling said articulated link and said fixed steering link.

8. The single-track crawler of claim 3, wherein said steering subsystem comprises:

an upper hinged member hinged to said structure link member allowing rotation of said upper hinged member about a horizontal hinge axis, said upper hinged member defining a hinged-member plane including the horizontal hinge axis;

a lower hinged member hinged to said upper hinged member allowing rotation between said lower hinged member and said upper hinged member in the hinged-member plane, said lower hinged member hinged to said upper hinged member proximate the end of said upper hinged member distal said structure link member;

a fixed steering link hinged to said single-track base unit allowing rotation of said fixed steering link about a horizontal axis, said fixed steering link spherically rotationally coupled to the end of said lower hinged member distal said upper hinged member; and an articulated link hinged to said upper hinged member and said lower hinged member to allow rotation in the hinged-member plane between said articulated link and said upper and lower hinged members, the length of said articulated link controlling the relative rotation between said upper hinged member and said lower hinged member.

9. A single-track crawler for supporting a conveyor span, the single-track crawler comprising:

a single-track base unit;

a structure link member translationally coupled to said single-track base unit to allow relative vertical translational motion between said single-track base unit and said structure link member; and an elevation control subsystem coupled to said single-track base unit and said structure link member, said elevation control subsystem controlling the vertical displacement between said single-track base unit and said structure link member.

10. The single-track crawler of claim 9, wherein said elevation control subsystem comprises a hydraulic cylinder coupled to said single-track base unit and said structure link member.

11. The single-track crawler of claim 9, wherein said structure link member is rotationally coupled to said single-track base unit to allow relative rotation in the horizontal plane between said single-track base unit and said structure link member.

12. The single-track crawler of claim 11, further comprising a steering subsystem coupled to said single-track base unit and said structure link member, said steering subsystem controlling relative horizontal rotation between said single-track base unit and said structure link member.

13. The single-track crawler of claim 12, wherein said steering subsystem comprises:

an articulated link having an adjustable length; and a fixed steering link coupled to said articulated link, the relative horizontal rotation between said single-track base unit and said structure link member being a function of the adjustable length of said articulated link.

14. The single-track crawler of claim 12, wherein said steering subsystem comprises:

an upper hinged member hinged to said structure link member allowing rotation of said upper hinged member about a horizontal hinge axis, said upper hinged member defining a hinged-member plane including the horizontal hinge axis;

a lower hinged member hinged to said upper hinged member allowing rotation between said lower hinged member and said upper hinged member in the hinged-member plane, said lower hinged member hinged to said upper hinged member proximate the end of said upper hinged member distal said structure link member;

a fixed steering link hinged to said single-track base unit allowing rotation of said fixed steering link about a horizontal axis, said fixed steering link spherically rotationally coupled to the end of said lower hinged member distal said upper hinged member; and an articulated link hinged to said upper hinged member and said lower hinged member to allow rotation in the hinged-member plane between said articulated link and said upper and lower hinged members, the length of said articulated link controlling the relative rotation between said upper hinged member and said lower hinged member.

15. A dual-track crawler for supporting a conveyor span, the dual-track crawler comprising:

a first single-track crawler as set forth in claim 12;

a second single-track crawler as set forth in claim 12; and a crawler linking member coupled to said first single-track crawler and said second single-track crawler.

16. A conveyor system:

a conveyor span;

a first dual-track crawler as set forth in claim 15 coupled to a first end of said conveyor span; and a second dual-track crawler as set forth in claim 16 coupled to a second end of said conveyor span.

17. The dual-track crawler of claim 15, further comprising:

a first shoe assembly coupling said first single-track crawler and said crawler linking member; and a second shoe assembly coupling said first single-track crawler and said crawler linking member.

18. The dual-track crawler of claim 17, wherein each of said shoe assemblies comprise a span attachment member for coupling to the conveyor span.

19. The dual-track crawler of claim 17, wherein each of said single-track crawlers are rotatable to a co-linear position for a lateral mode of operation, and each of said single-track crawlers are rotatable to a parallel position for a longitudinal mode of operation.

* * * * *